United States Patent [19]
Vos

[11] Patent Number: 5,570,626
[45] Date of Patent: Nov. 5, 1996

[54] COOKING APPARATUS

[75] Inventor: Peter M. Vos, Malaga, Australia

[73] Assignee: Vos Industries Ltd., Australia

[21] Appl. No.: 341,578

[22] PCT Filed: May 25, 1993

[86] PCT No.: PCT/AU93/00240

§ 371 Date: Dec. 27, 1994

§ 102(e) Date: Dec. 27, 1994

[87] PCT Pub. No.: WO93/24040

PCT Pub. Date: Dec. 9, 1993

[30] Foreign Application Priority Data

May 26, 1992 [AU] Australia .................................. PL2597
May 26, 1992 [AU] Australia .................................. PL2598
May 26, 1992 [AU] Australia .................................. PL2599

[51] Int. Cl.⁶ .............................. A47J 37/00; A47J 37/12
[52] U.S. Cl. .......................... 99/404; 99/407; 99/443 C;
99/408; 99/446; 99/516
[58] Field of Search ................................ 99/443 C, 404,
99/516, 446, 407, 408; 127/391; 210/167,
DIG. 8; 426/438

[56] References Cited

U.S. PATENT DOCUMENTS 1,921,231 8/1933 Jourdan .
4,064,796 12/1977 Jones ........................................... 99/330
4,189,994 2/1980 Schmader .................................. 99/406
4,882,984 11/1989 Eves, II .................................... 99/443 C
5,101,714 4/1992 Grandi ..................................... 99/443 C
5,179,890 1/1993 Reuveni et al. ......................... 99/443 C

FOREIGN PATENT DOCUMENTS

26906/77 1/1979 Australia .
621821 6/1949 United Kingdom .

Primary Examiner—David Scherbel
Assistant Examiner—Reginald L. Alexander
Attorney, Agent, or Firm—Westman, Champlin & Kelley, P.A.

[57] ABSTRACT

Disclosed is a cooking apparatus (10) having a housing (12) containing a cooking chamber (14) into which cooking medium is sprayable by spray means (16) to cook food items in the cooking chamber (14). The apparatus (10) stores cooking medium in a buffer tank (18) from which it is circulated by circulation means (20,42) to the spray means (16). Heating of the cooking medium occurs by operating at least one flow heater (22) located in the circulation means (20,42) between the buffer tank (18) and the spray means (16). If desired, a plurality of flow heaters (22) can be used and an additional preheater (48) may also be operated to assist in heating the cooking medium at start-up.

17 Claims, 3 Drawing Sheets

COOKING APPARATUS

BACKGROUND OF THE INVENTION

The present invention relates to a cooking apparatus which is of particular advantage for high output processing of food.

There is a requirement for cooking apparatus which can cook high volumes of food items in a time and energy efficient manner. Therefore, it is most important that the cooking medium be used as sparingly as possible to reduce heating and other running costs. This problem is particularly acute in the case of cooking media such as vegetable oil, animal fat, shortening and the like, which also readily oxidise if overheated. This results in wastage of cooking medium and poor food quality.

Further, oxidation of cooking media is a problem that still requires attention by manufacturers of cooking apparatus. The problem primarily arises from two sources; firmly, inadequate cooking medium temperature control and, secondly, continued usage of cooking apparatus in which the cooking chamber is exposed to air.

Exemplary of an apparatus having the aforementioned disadvantages is British Patent No. 621821 (Crittall) which cooks food by low pressure spraying of cooking medium onto food items and provides the heater means for the cooking medium in complete isolation to the cooking apparatus. Further, the heater means or calorifier is in the form of a heated sump or tank-like reservoir. Thus heat loss problems are caused by heat loss from the calorifier, which requires high energy inputs to overcome the isolation thereof from the cooking apparatus. Moreover, sumps having a high volume have been found by the present inventor to require longer residence times for efficient heating of the cooking medium. On the other hand, smaller volumes expose the cooking medium to overheating, consequential wastage and undesirable oxidation.

Further, if the cooking medium is a solid fat, serious problems of congelation may well be found to occur in the calorifier and the pipes leading from the calorifier to the cooking chamber, the more so because the spraying of cooking media occurs at low pressure.

Any attempt to overcome these problems at the calorifier by high energy inputs is likely to result in unacceptable temperature over-runs in the cooking medium leading to burning of food items, oxidation of the cooking medium and consequential undesirable food taste and odour quite apart from the added energy costs.

U.S. Pat. No. 4,047,476 relates to an improvement to the Crittall cooking apparatus which employs high pressure sprays. This may lead to better heat exchange in the cooking operation but heating of the cooking medium still occurs in a cooking medium sump with the problems this entails in terms of high energy input, uneven heating of the cooking medium and oxidation thereof. Therefore, this proposal does not address some of the most critical problems of the Crittall apparatus.

SUMMARY OF THE INVENTION

It is the object of the present invention to provide a cooking apparatus which addresses the problem of oxidation and wastage of cooking medium while at the same time achieving even heating thereof and good food output quality.

With this object in view, the present invention provides, in its first aspect, a cooking apparatus comprising a housing containing a cooking chamber into which cooking medium is sprayable from spray means to cook food items present in the cooking chamber; buffer tank means for storage of cooking medium; and circulation means to circulate cooking medium from the buffer tank means to the spray means characterised in that at least one flow heater means is arranged in the circulation means between the buffer tank means and the spray means to heat cooking medium flowing in the pipe means from the buffer tank means to the spray means.

It may be found desirable for the buffer tank means to still be provided with a second heater means to act as an additional heater to heat cooking medium stored in said buffer tank means, particularly at start-up but the first and second heater means can be operated independently of each other to achieve desired temperature control, the first flow heater means being preferably operable alone following the achievement of a desired cooking medium temperature. Potentially, however, the flow heater means being an efficient heat exchanger achieves better heat exchange than a heater located within a sump and thus better temperature control of the cooking medium. If necessary, further flow heaters can be added to obtain desired temperature control. It is to be understood that the cooking apparatus of the present invention does not subject food items to immersion and thus the buffer tank means is ideally located separately to the cooking chamber, further assisting in the avoidance of oxidation of the cooking medium.

In a second aspect, the cooking apparatus also comprises filter means to filter the cooking medium prior to entry thereof to the buffer tank means. The buffer tank means may also be provided at an outlet thereof with a second filter means, such as a Franz filter, for removal of dust-like debris from the cooked food items.

In a third aspect, the invention can provide a method of operating a cooking apparatus wherein an inert gas with respect to the cooking medium is introduced to the cooking chamber during the cooking operation to purge air therefrom. This air causes undesirable oxidation of cooking media such as fats and oils and is a major contributor to high cooking media supply costs and poor food quality. This inert gas employed may simply be steam, but can be any gas acceptable for use in cooking operations.

BRIEF DESCRIPTION OF THE DRAWINGS

The present invention will now be described, by way of example, with reference to the accompanying drawings, in which.

DETAILED DESCRIPTION OF THE DRAWINGS

Figure 1:
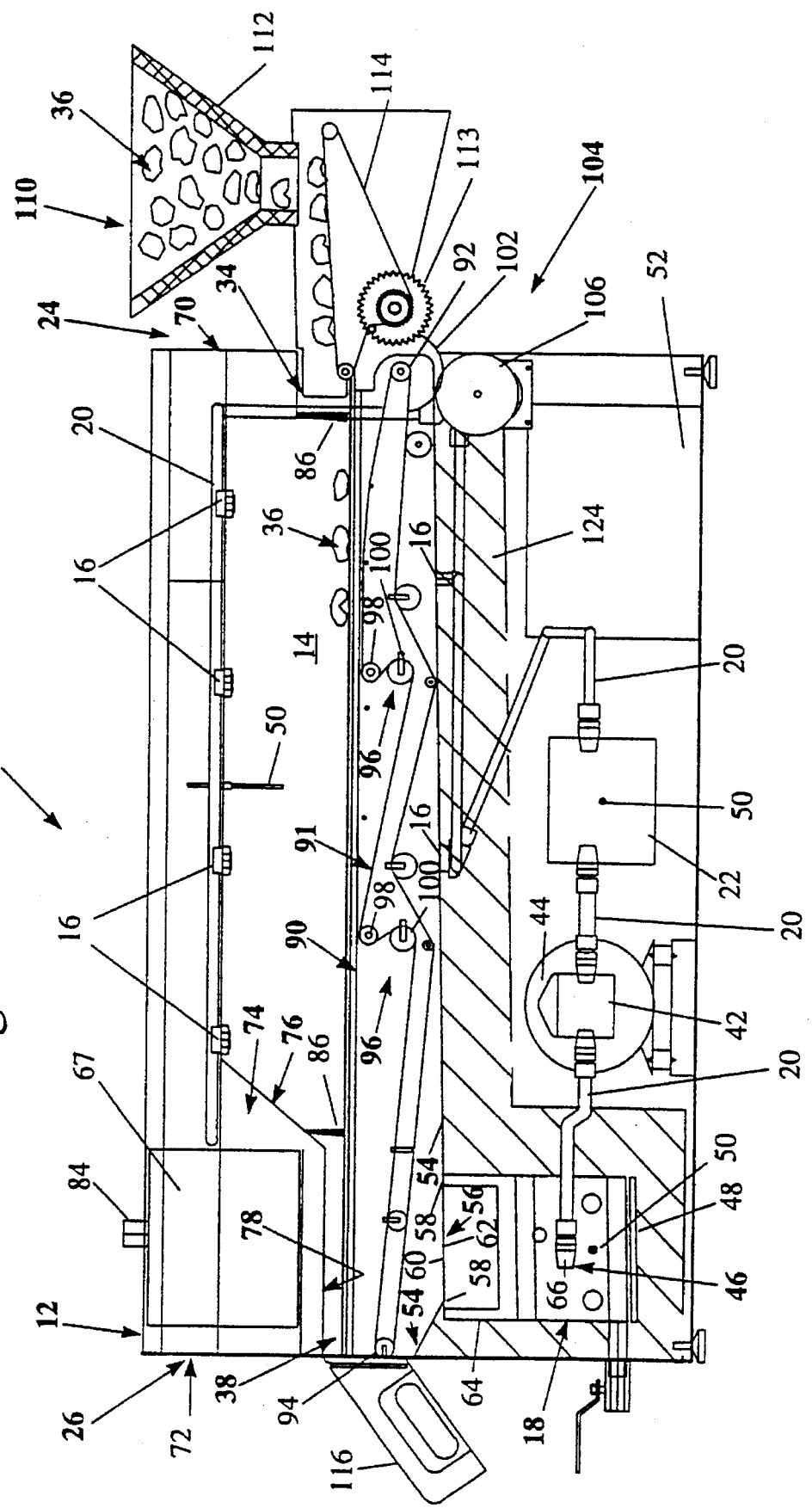
FIG. 1 is a front elevation view (showing the inside) of an embodiment of a cooking apparatus in accordance with the present invention.
Figure 2:
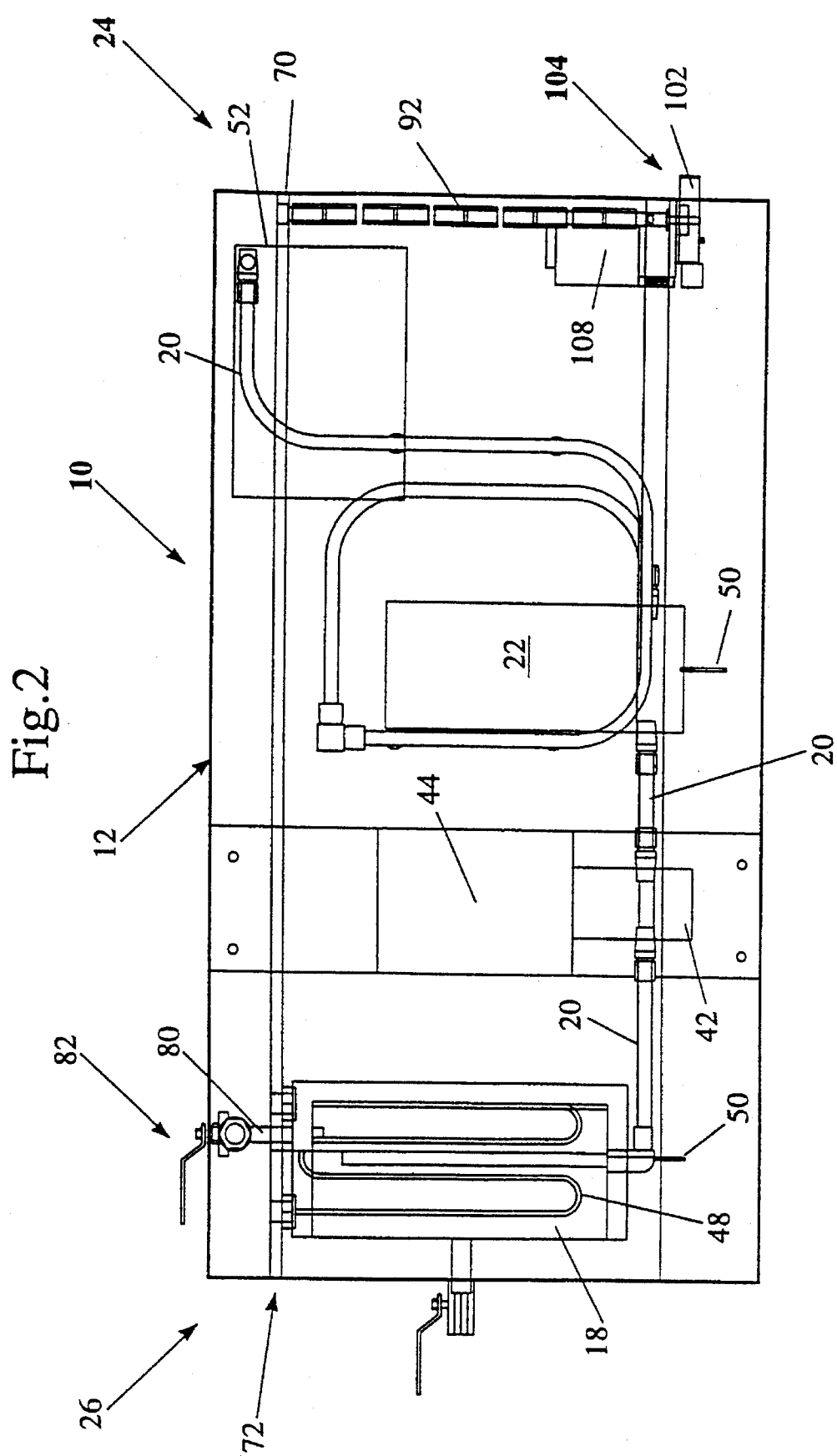
FIG. 2 is a plan view (showing the inside) of the cooking apparatus shown in FIG. 1.
Figure 4:
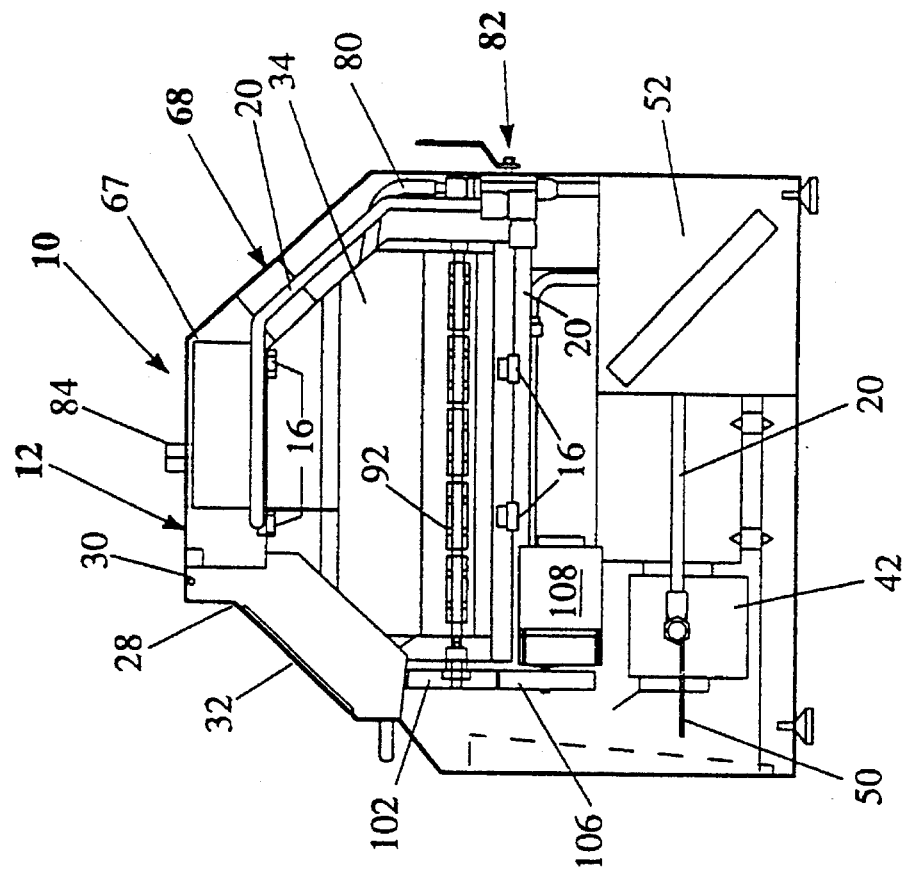
FIG. 4 is an elevation view of the inlet end (showing the inside) of the cooking apparatus shown in FIG. 1.
Figure 3:
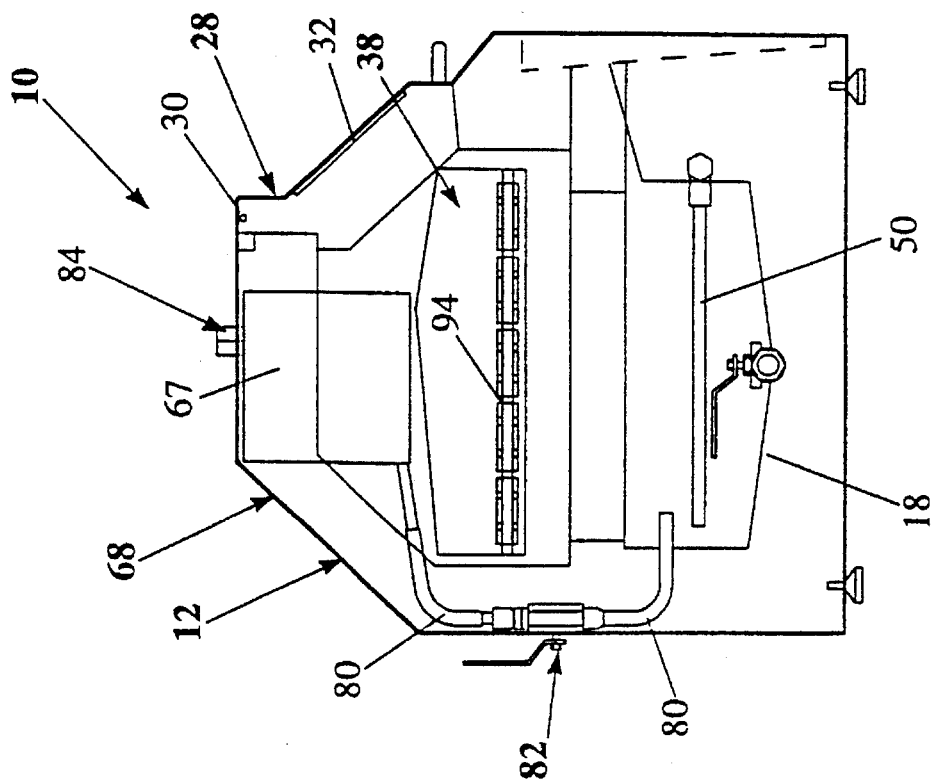
FIG. 3 is an elevation view of the outlet end (showing the inside) of the cooking apparatus shown in FIG. 1.

In the drawings, them is shown a cooking apparatus 10 comprising a housing 12 containing a cooking chamber 14, sprayers 16 for spraying cooking medium, a buffer tank 18 for cooking medium, pipes 20 to carry the cooking medium, and at least one flow heater 22 arranged to heat cooking medium being carded from the buffer tank 18 to the sprayers 16.

The flow heater 22 heats the cooking medium in the pipes 20, i.e between the buffer tank 18 and the sprayers 16. Although one such flow heater 22 is employed in this embodiment, any desired number of flow heaters may be used.

The housing 12 has a food inlet end 24 and a food outlet end 26 with the cooking chamber 14 therebetween.

The housing 12 has a cover 28 which is pivotally connected with the remainder of the housing 12 by pivotal connections 30. A window 32 may be provided in the cover 28 at the front of the housing 12 such that the cooking chamber 14 may be viewed. The food inlet end 24 of the housing 12 has an opening 34 for entry of food items 36 to be cooked in the cooking chamber 14. Similarly, the food outlet end 26 is provided with an opening 38 for exit of the food items 36 once they have been cooked in the cooking chamber 14.

A pump 42 is provided to pump cooking medium from the buffer tank 18 through the pipes 20 to the sprayers 16. A motor 44 is provided to power the pump 42.

A portion of pipe 20 extends from the buffer tank 18 to the pump 42. This forms the suction line of the pump 42. This portion of pipe 20 has an inlet 46 so that cooking medium can pass therethrough from the buffer tank 18.

The flow heater 22 may be provided at any suitable position between the buffer tank 18 and the sprayers 16 such that cooking medium in the pipes 20 is heated.

The flow heater 22 may be provided on the exhaust side of the pump 42 (as shown in the drawings) or on the suction side. Several flow heaters 22 may be provided depending upon the length of the pipes 20 between the buffer tank 18 and the sprayers 16, and the requirement for precise temperature control.

The flow heater 22 may be of any suitable type that is able to heat the cooking medium carded in the pipes 20 from the buffer tank 18 to the sprayers 16, but should not consist of a sump which reduces energy efficiency.

For example, the flow heater 22 may be provided in the flow line of the pipes 20 such that the cooking medium flows from the pipe 20 into the flow heater 22 and then flows into the next portion of the pipe 20 toward the sprayers 16. The flow heater 22 heats the cooking medium as it flows therethrough.

Another example of a flow heater 22 is a type which attaches to the exterior of the pipes 20 and heats the cooking medium flowing therein. This is of especial importance where solid fats, which may congeal in the pipes 20, are employed.

If desired, a preheater 48 may be provided to e.g oil, heat cooking medium in the buffer tank 18, generally at start-up where the cooking medium can be heated to just below the required operating temperature. After this time the flow heater 22 may operate alone.

The preheater 48 may be of any suitable type, and may be provided outside the buffer tank 18 (as shown in the drawings) and/or inside the buffer tank 18.

If the preheater 48 is provided in the buffer tank 18, then the inlet 46 is provided above the preheater 48. This prevents exposure of the preheater 48 should the level of cooking medium in the buffer tank 18 fall below the level of the inlet 46.

Alternatively, the inlet 46 may be provided below the preheater 48 provided there is a safety cut-off in case the cooking medium level drops to the level of the preheater 48 or the temperature of the cooking medium increases above a selected value.

Temperature probes 50 may be provided at selected positions in the cooking apparatus 10.

Accordingly, a temperature probe 50 may, for example, be provided in the buffer tank 18, at the outlet of the flow heater 22, and in the cooking chamber 14, e.g at the sprayers 16.

A control box 52 may be provided at the front of the housing 12 carrying the operating controls for the cooking apparatus 10. The control box controls the operation of the preheater 48 and the flow heater 22 according to heat input requirements.

The housing 12 has a surface 54 at the bottom of the cooking chamber 14. The surface 54 slopes downwardly to an opening 56. The opening 56 forms an outlet so that any excess cooking medium, sprayed by the sprayers 16 onto the cooking chamber 14, can pass through the opening 56. The opening 56 is positioned near the food outlet end 26, but spaced slightly therefrom. Thus, the surface 54 slopes downwardly to the edges 58 of the opening 56 on all sides of the opening 56. In this way, any cooking medium which falls upon the surface 54 can run therealong to the opening 56 and pass therethrough.

However, alternative arrangements of the opening 56 may be provided, e.g the opening 56 may be provided near the food inlet end 24, or intermediate the food inlet end 24 and the food outlet end 26.

A plate 60 having holes 62 therein may be provided over the opening 56. The cooking medium then passes through the opening 56 via these holes 62.

A filter 64 is provided under the opening 56. The filter 64 filters the cooking medium after it has passed from the cooking chamber 14 through the opening 56.

The filter 64 may be removed from the housing 12 at the front thereof. This may be done by sliding the filter 64 out of the housing 12.

The buffer tank 18 is provided in the housing 12 under the cooking chamber 14.

The buffer tank 18 is provided beneath the opening 56 and the filter 64 such that the filter 64 is intermediate the opening 56 and the buffer tank 18. In this way, cooking medium passing from the cooking chamber 14 through the opening 56 passes through the filter 64 prior to entering the buffer tank 18. This removes food particles and other debris from the cooking medium before they enter the buffer tank 18.

The buffer tank 18 is preferably separate from the cooking chamber 14 and may also be provided with means (not shown) to maintain the level of cooking medium in the buffer tank 18 at a selected correct operational, minimal level. Alternatively, the buffer tank 18 may be provided such that it is exposed to the cooking chamber 14.

The pipes 20 carry the cooking medium from the buffer tank 18 to the sprayers 16. The sprayers 16 spray the cooking medium into the cooking chamber 14 to shower and contact the food 36. In this way, the food 36 is cooked.

The sprayers 16, which may be in the form of nozzles, can be arranged to spray cooking medium into the cooking chamber 14 from the upper, lower, and/or side parts thereof. This arrangement is shown in the drawings.

A second filter 66 may be provided at the inlet 46 to filter the cooking medium before it enters the portion of pipe 20 from the buffer tank 18. A Franz filter may also be placed in pipe portion 20 is for removing residual dusty food particles. This would preferably be placed after the flow heater 22.

When both the filter 64 and the second filter 66 are used, the filter 64 may be used to filter coarser food particles and debris from the cooking medium so that they do not enter the buffer tank 18, and the filter 66 may be used to filter any finer particles so that they do not enter the pipe 20 from the buffer tank 18 causing blockage of sprayers 16. Both filters 64 and 66 are removable and replaceable.

The cooking apparatus 10 may additionally comprise a tank 67 for storing and adding cooking medium.

The housing 12 further comprises a panel 68 at the rear thereof and end panels 70 and 72 at the respective ends thereof.

The housing 12 also comprises a series of baffles 74, 76 and 78 which separate a portion of the inside of the housing 12 from the cooking chamber 14. The baffle 74 is a side baffle which is seen face-on in FIG. 1; the baffle 76 is also a side baffle and is seen edge-on in FIG. 1; and, the baffle 78 is a bottom baffle which is seen edge-on in FIG. 1.

These baffles 74, 76 and 78 form a space with the panel 68 and the end panel 72 which may accommodate the tank 67.

In this position, the tank 67 is provided adjacent the cooking chamber 14 inside the housing 12.

The tank 67 is connected to the buffer tank 18 by a pipe 80. Cooking medium is able to flow from the tank 67 into the buffer tank 18 via the pipe 80. The flow of the cooking medium from the tank 67 to the buffer tank 18 is a gravity flow. For this purpose the tank 67 can be hermetically sealed. A valve or solenoid arrangement 82 may be provided in the pipe 80 to control the flow of cooking medium in the pipe 80 from the tank 67 to the buffer tank 18.

The tank 67 is the storage reservoir for cooking medium. Additionally, fresh or replenishing supply of cooking medium for the cooking apparatus 10 is loaded into the tank 67. For this purpose the tank 67 may be provided with an inlet 84.

The cooking medium is able to flow from the tank 67 to the buffer tank 18 such that a selected level of cooking medium can be maintained in the buffer tank 18.

In this way, use of the tank 67 ensures that the level of cooking medium in the buffer tank 18 is maintained at the selected level. The reason for this is to ensure that the portion of pipe 20 that extends from the buffer tank 18 is always filled with cooking medium, since this portion of pipe 20 is the suction line for the pump 42.

An alternative arrangement (not shown) of the tank 67 is to provide the tank 67 beside the buffer tank 18. The buffer tank 18 and the tank 67 are in fluid communication, e.g by a pipe, near their lower regions. A valve is provided to control this fluid communication.

An alternative arrangement (not shown) is to provide the tank 67 outside the housing 12. A small heater is provided to heat cooking medium in the tank 67 to melt it in the case of the cooking medium being solid.

The cooking apparatus 10 may be provided with flaps 86 and 88 inside the housing near the food inlet end 24 and food outlet end 26, respectively. The flaps 86 and 88 close off the cooking chamber 14.

Means to carry food to be cooked through the cooking apparatus 10, e.g a conveyor 90, is provided. This conveyor 90 is provided in the cooking chamber 14 between the food inlet end 24 and the food outlet end 26.

The conveyor 90 is provided in the cooking chamber 14 such that it is positioned wholly within the housing 12. This enables the cooking chamber 14 to be effectively sealed. The flaps 86 and 88 assist in this. By sealing the cooking chamber 14 in this manner, it is possible to maintain a more effective temperature control of the cooking chamber 14 which results in more efficient cooking of the food 36. Further, problems associated with cooking medium dripping from the conveyor 90 to the exterior of the housing 12 are eliminated. Any excess cooking medium is returned to the buffer tank 18 (as hereinbefore described).

The conveyor 90 comprises a conveyor belt 91 which is of the endless type and passes around and extends between a first end roller 92 and a second end roller 94 in looplike manner. The first end roller 92 is positioned in the region of the food inlet end 24 of the housing 12. The second end roller 94 is positioned in the region of the food outlet end 26 of the housing 12.

Dips 96 may be provided in the conveyor belt 91, by pairs of guide and/or tensioning rollers 98 and 100 and are of particular advantage in the cooking of potato chips.

Provision for adjusting the tension of the conveyor belt 91 may be incorporated into the conveyor 90 by mounting the ends of the rollers 98 and/or 100 in pairs of curved slots (not visible) in respective side frame numbers of the conveyor 90. In such a case, these curved slots are provided in place of the holes for mounting the rollers 98 and/or 100. The rollers 98 and/or 100 may be locked into position at any required position between the ends (not visible) of their respective curved slots.

The conveyor belt 91 is preferably of a form such that fluid can pass therethrough. However, wiping of excess cooking fluid from the belt 91 may be achieved by the provision on conveyor 90 of a wiper roller (not shown).

The conveyor belt 91 shown in the drawings is made of a grid-like mesh of interconnected wire, and readily enables fluid to pass therethrough.

Whilst a specific embodiment of a conveyor has been hereinabove described, any suitable form of conveyor may be used.

The conveyor 90 further comprises a drive arrangement which may be in the form of toothed wheels 102 to enable drive to be imparted to the conveyor belt 91. Rotation is imparted to the toothed wheels 102 by a drive mechanism 104. The drive mechanism 104 comprises toothed wheels 106 which can be driven by a motor 108. The drive mechanism 104 is mounted in the housing 12.

When the conveyor 90 is in position in the housing 12 the toothed wheels 102 and 106 mesh.

A loader may be provided for loading food at the food inlet end 24 and may be in the form of a sub conveyor 110 though alternative forms of loading food at the food inlet end 24 may be used.

The sub conveyor 110 may be provided with a hopper 112 for loading food 36 onto the sub conveyor 110. The sub conveyor 110 is provided with a toothed wheel 113 which meshes with the toothed wheel 102 of the conveyor 90. In this way, drive is transferred from the toothed wheel 102 to the toothed wheel 112.

The sub conveyor 110 is removable, as is the conveyor 90.

The conveyor belt 114 of the sub conveyor 110 may be of a similar structure to that of the conveyor 90. It will be clear that the conveyor belt 114 and sub-conveyor 110 can be provided in the form of a single conveyor unit.

A discharge chute 116 is provided at the food outlet end 26. Food 36 exits via the opening 38 and is discharged via a removable discharge chute 116.

The manner of use and operation of cooking apparatus 10 will now be described.

In use, the flow heater 22 (and the preheater 48, if provided) is activated to heat the cooking medium.

The preheater 48 is preferably provided if the cooking medium used is a solid at room temperature, e.g solid fat and may be used to achieve preheating of cooking medium present within the buffer tank 18. After preheating, the preheater 48 is preferably not to be operated for the reasons hereabove.

When the temperature sensors 50 sense that operating temperature for the cooking medium has been reached, the motor 44 can be activated so that the pump 42 commences to pump cooking medium from the buffer tank 18 through the pipes 20 to the sprayers 16. The cooking medium is then sprayed out through the sprayers 16 and into the cooking chamber 14. The drive mechanism 104 can be activated when the desired cooking temperature is reached and this causes drive to be imparted to the conveyor 90 and the subconveyor 110 by way of the toothed wheels 106, 102 and 113. This causes the conveyor belts 92 and 114 to move.

Food items 36 are deposited into the hopper 112 and land on the conveyor belt 114 of the sub-conveyor 110. The food items 36 are conveyed therealong and then fall onto the conveyor belt 91 of the conveyor 909. The food 36 travels along the conveyor belt 91 toward the opening 38 at the food outlet end 26. The food 36 travels along the conveyor 90 and, initially, being at a temperature of, for example, –18° C. is allowed to quickly thaw causing a stream of steam to flow through the heated cooking chamber 14. This procedure enables air which can cause undesirable oxidation of cooking medium to be removed from the cooking chamber 14 increasing the effectiveness of oil usage. The process may be enhanced by providing means 130 to add to the cooking chamber 14 additional purging steam or an inert gas with respect to the cooking medium. Of course the inert gas should be acceptable for use with cooking and could for example be nitrogen or argon. Further travel along the belt results in cooking by the cooking medium being sprayed from the sprayers 16. The cooked food 36 discharges at the food outlet end 26 by way of the opening 38 and the discharge chute 116.

If the conveyor 90 is provided with a conveyor belt 91 having dips 96, as shown in the drawings, these dips 96 provide a tumbling effect to the food 36 as it is conveyed along the conveyor 90. This improves the cooking efficiency.

During the cooking process, the cooking medium is sprayed into the cooking chamber 18 and showers and contacts the food 36 on the conveyor 90.

The conveyor belt 91 of the conveyor 90 permits excess cooking medium in the cooking chamber 14 to pass therethrough onto the surface 54. This cooking medium then runs along the surface 54 towards the opening 56. The cooking medium then passes from the cooking chamber 14 through the opening 56 and through a filter 64, prior to re-entering the buffer tank 18. In this way, the buffer tank 18 is separate from and isolated from the cooking chamber 14 and there is no accumulation of cooking medium in a vat, reservoir or the like in the cooking chamber 14 or in open communication with the cooking chamber 14. This also avoids oxidation of cooking medium which would otherwise occur due to contact with any residual air inside the cooking chamber 14. Oxidation may also be reduced by providing floats (not shown) on the surface of the cooking medium in the buffer tank 18 which reduces the surface area of cooking medium exposed to air.

The total amount of cooking medium in the buffer tank 22 and pipes 24 need be sufficient only to enable suction of cooking medium from the buffer tank 22 and to fill the pipes 24.

Accordingly, only a minimal amount of cooking medium need be present in the buffer tank 18. For example, the buffer tank may contain about 5 litres of cooking medium, though varying capacities of buffer tank 18 are within the scope of the invention.

Cooking medium is then sucked from the buffer tank 18 (after again being filtered by the filter 66, if present). The cooking medium then enters the portion of the pipe 20 that extends from the buffer tank 18 for further re-heating by the flow heater 22 prior to being re-sprayed through the sprayers 16.

The use of the flow heater 22 to heat the cooking medium being carried in the pipes 20 from the buffer tank 14 to the sprayers 16 avoids problems of heating a body of cooking medium in a single reservoir. This latter arrangement results in the problem of "temperature over-run" in which the heater itself heats to a temperature higher than the required operating temperature to which the cooking medium needs to be heated. This temperature over-run results in the heater heating the body of the cooking medium to a temperature greater than the required operating temperature. This is undesirable. Another problem that may occur and which is avoided by this arrangement is insufficient heating or cooling of the cooking medium during operation of the cooking apparatus 10.

It may be additionally desirable to have a preheater 48 to heat the cooking medium in the buffer tank 14, particularly at start-up. However, this preheater 48 heats the cooking medium in the buffer tank 14 to a selected temperature below the operating temperature, e.g this may be approximately 20° C. below the operating temperature, e.g up to 160° C. The flow heater 22 then heats the cooking medium to the required operating temperature. The preheater 48 ideally operates only at "start-up" and if the temperature of the cooking medium in the buffer tank 18 falls below the selected temperature.

The sensors 50 sense the temperature of the cooking medium at various locations in the cooking apparatus 10 to ensure optimum operation. It is preferable that the sensor 50 in the cooking chamber 14 is provided as close as possible to the sprayer 16. As indicated previously, several flow heaters 22 may be provided if desired.

The positioning of the tank 67 as hereinabove described, ensures that the cooking medium in the tank 67 is at an elevated temperature. This is because of the heat transfer from the cooking chamber 14 to the tank 67 through the baffles 74, 76 and 78. The positioning of the tank 67 at a higher level than the buffer tank 18 permits the cooking medium to flow from the tank 67 to the buffer tank 18 by gravity.

The housing 12 may be insulated as shown at 124. However, there would be not insulation between the space occupied by the tank 67 and the cooking chamber 14 to ensure that there is heat transfer between the cooking chamber 14 and the tank 67. Further, the positioning of the tank 67 as hereinbefore described (in proximity to the cooking chamber 14) enables solid or liquid cooking medium to be used. Even if solid cooking medium is used, it can be placed into the tank 67 and due to the positioning of the tank 67 in proximity to the cooking chamber 14, the heat will cause the solid cooking medium to melt into liquid which can then flow through the pipes 20 of the cooking apparatus.

The cooking apparatus 10 may be of any desired capacity and can be adapted to domestic as well as industrial use.

Modifications and variations such as would be apparent to a skilled addressee are deemed within the scope of the present invention.

The claims defining the invention are as follows:

1. A spray cooking apparatus comprising:

a housing containing a cooking chamber into which cooking medium is sprayable from spray means to cook food items present in said cooking chamber;

buffer tank means for storage of cooking medium and receipt of excess cooking medium from said cooking chamber; and circulation means to circulate cooking medium from said buffer tank means to said spray means, wherein at least one flow heater means is arranged in said circulation means to heat cooking medium flowing in said circulation means externally of said buffer tank means, whereby said cooking medium can be heated by said heater means to a predetermined extent without being overheated, after it leaves said buffer tank means and while flowing thence towards said spray means by way of said circulation means, and said heater means being sufficient of itself to maintain cooking temperature once normal operating conditions have been established.

2. The cooking apparatus as claimed in claim 1 in which a plurality of flow heater means are arranged in said circulation means.

3. The cooking apparatus as claimed in claim 1 and in which said buffer tank means is provided with a second heater means to heat cooking medium stored in said buffer tank means.

4. The cooking apparatus as claimed in claim 3 and in which said flow heater means and said second heater means are operated independently of each other.

5. The cooking apparatus as claimed in claim 1 and in which said circulation means includes pump means to pump cooking medium from said buffer tank means to said spray means.

6. The cooking apparatus as claimed in claim 1 and in which said cooking chamber communicates with said buffer tank means through a filter means arranged such that cooking medium passes through said filter means prior to entering said buffer tank means.

7. The cooking apparatus as claimed in claim 6 in which a filter means is provided at an outlet of said buffer tank means.

8. The cooking apparatus as claimed in claim 5 and in which said flow heater means is located on a side of said pump means closest to the spray means.

9. The cooking apparatus as claimed in claim 3 and in which said second heater means is operated only in a start-up period to heat said cooking medium to a desired cooking temperature.

10. The cooking apparatus as claimed in claim 1 and in which said housing has a food inlet end and a food outlet end and that first conveyor means is arranged to be positioned in said housing intermediate said food inlet end and said food outlet end and second conveyor means are arranged to be positioned at said food inlet end such that food items placed on said second conveyor means are transferred to said first conveyor means.

11. A cooking apparatus as claimed in claim 1 and a source of a gas inert with respect to the cooking medium connected to said cooking chamber during the cooking operation to purge air therefrom.

12. A cooking apparatus as claimed in claim 1 and in which said buffer tank means is arranged such that excess cooking medium passes through a filter means prior to entering said buffer tank means.

13. A cooking apparatus as claimed in claim 12 and in which said buffer tank means is provided with a second filter means on an outlet side thereof.

14. A spray cooking apparatus comprising:

a housing containing a cooking chamber into which cooking medium is sprayable from spray means to cook food items present in said cooking chamber;

buffer tank means for storage of cooking medium and receipt of excess cooking medium from said cooking chamber; and circulation means within said housing to circulate cooking medium from said buffer tank means to said spray means, wherein at least one flow heater means is arranged in said circulation means to heat cooking medium flowing in said circulation means externally of said buffer tank means, whereby said cooking medium can be heated by said heater means to predetermined extent without being overheated, after it leaves said buffer tank means and while flowing towards said spray means by way of said circulation mean, and said heater means being sufficient of itself to maintain cooking temperature once normal operating conditions have been established, said cooking chamber having means substantially closing it off from the ambient air.

15. A cooking apparatus comprising:

a housing containing a cooking chamber into which cooking medium other than water is sprayable from spray means to cook food items present in said cooking chamber;

buffer tank means for storage of cooking medium and receipt of excess cooking medium from said cooking chamber; and circulation means within said housing to circulate cooking medium from said buffer tank means to said spray means, wherein at least one flow heater means is arranged in said circulation means externally of said buffer tank means to heat cooking medium flowing in said circulation means, and means for selectively introducing one of an inert gas and steam into said cooking chamber in order substantially to purge the chamber of ambient air.

16. A method of cooking food items comprising:

introducing food items to a cooking chamber; and spraying said food items with a heated cooking medium by spray means, said heated cooking medium being supplied from a buffer tank means to said spray means by a circulation means wherein said cooking medium is heated by at least one flow heater means arranged in said circulation means externally of said buffer tank means to a desired cooking temperature.

17. A method of cooking as claimed in claim 16 and in which in that heating cooling medium to desired cooking temperature is assisted by operation of a second heater means for heating cooking medium in said buffer tank means.

* * * * *